L. W. SAINE.
MACHINE FOR SHARPENING GIN AND OTHER LIKE SAWS.
APPLICATION FILED JUNE 28, 1916.
1,220,894.
Patented Mar. 27, 1917.
3 SHEETS—SHEET 2.
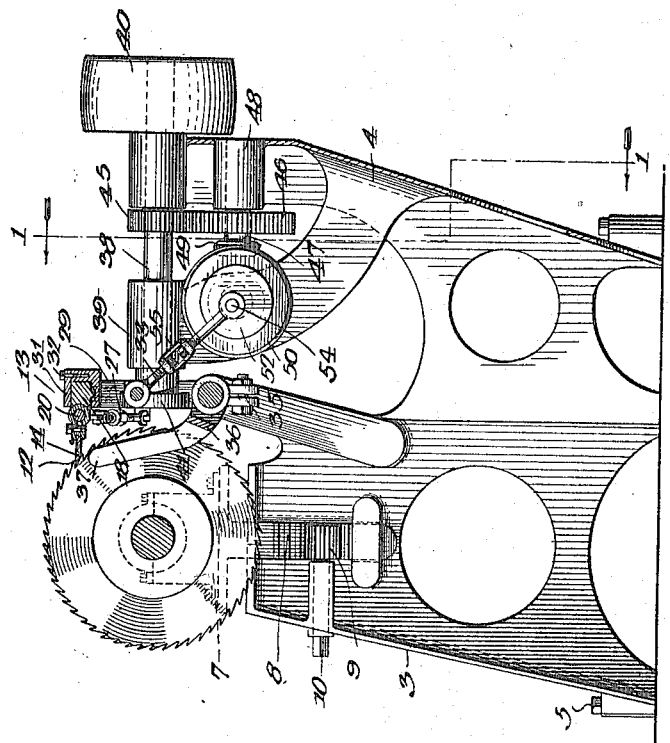
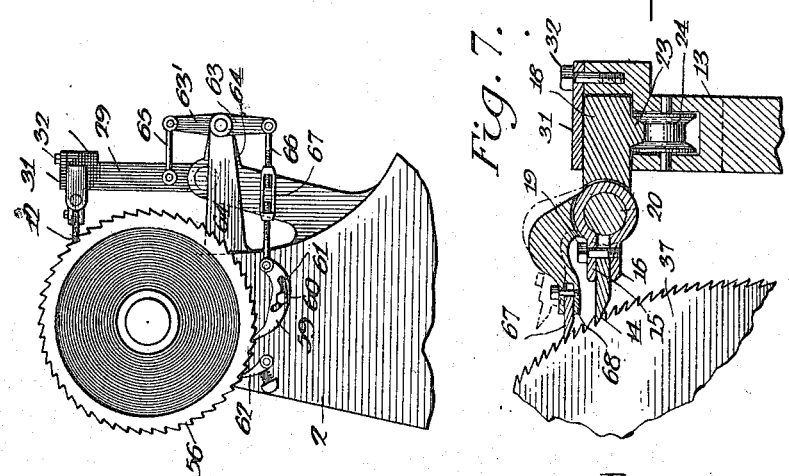

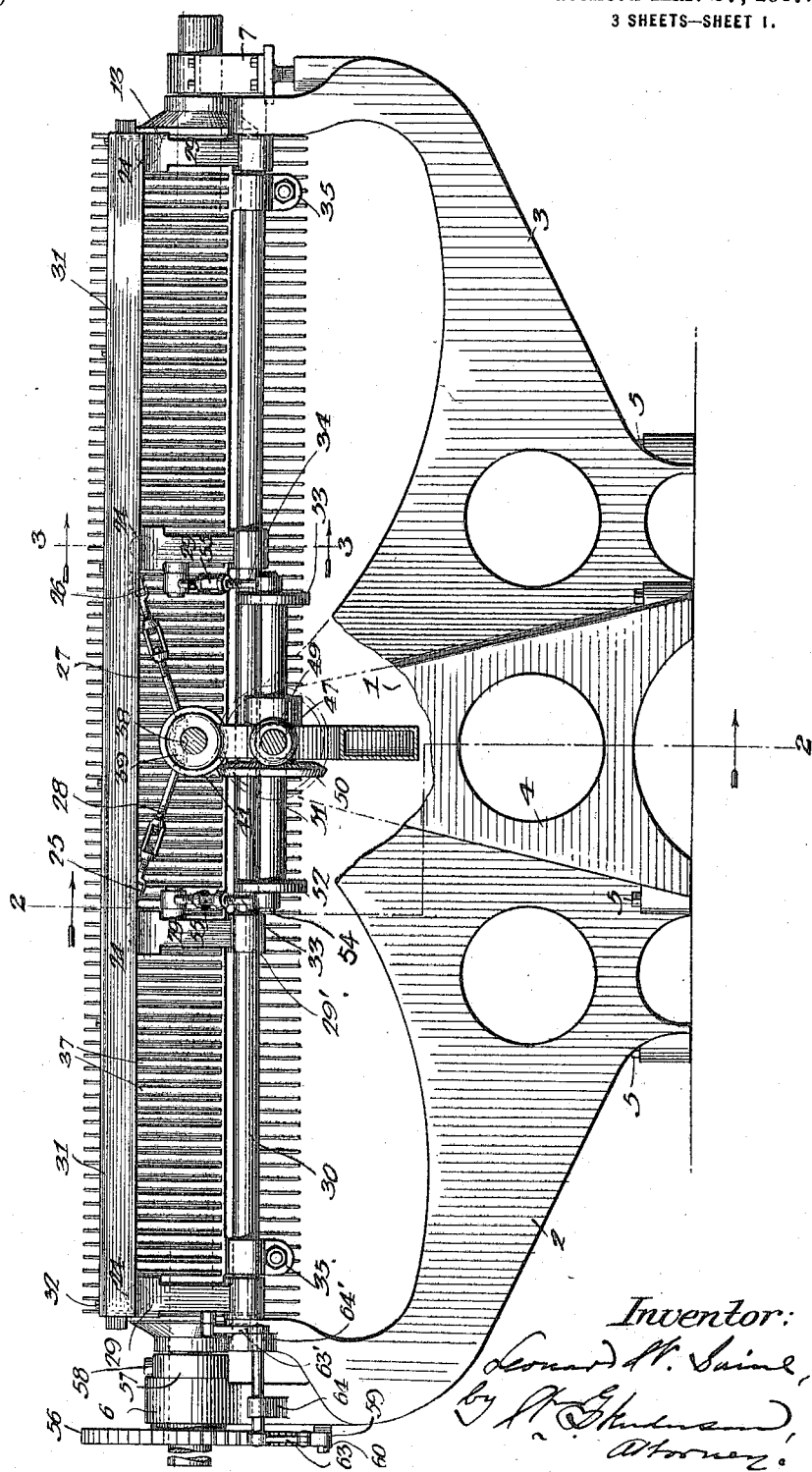

L. W. SAINE.
MACHINE FOR SHARPENING GIN AND OTHER LIKE SAWS.
APPLICATION FILED JUNE 28, 1916.
1,220,894.
Patented Mar. 27, 1917.
3 SHEETS—SHEET 3.
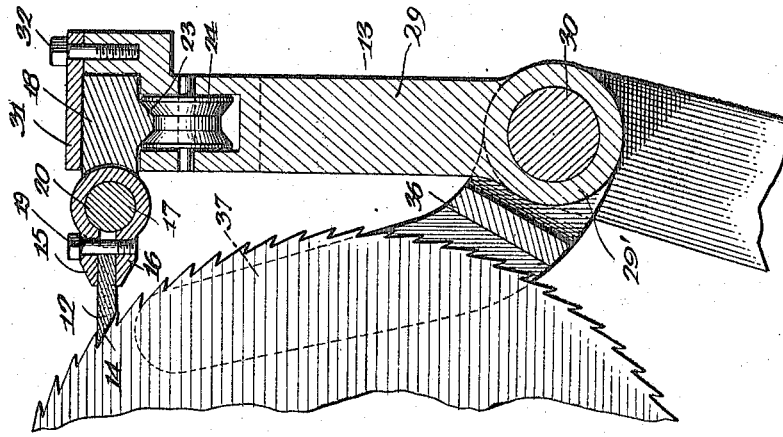
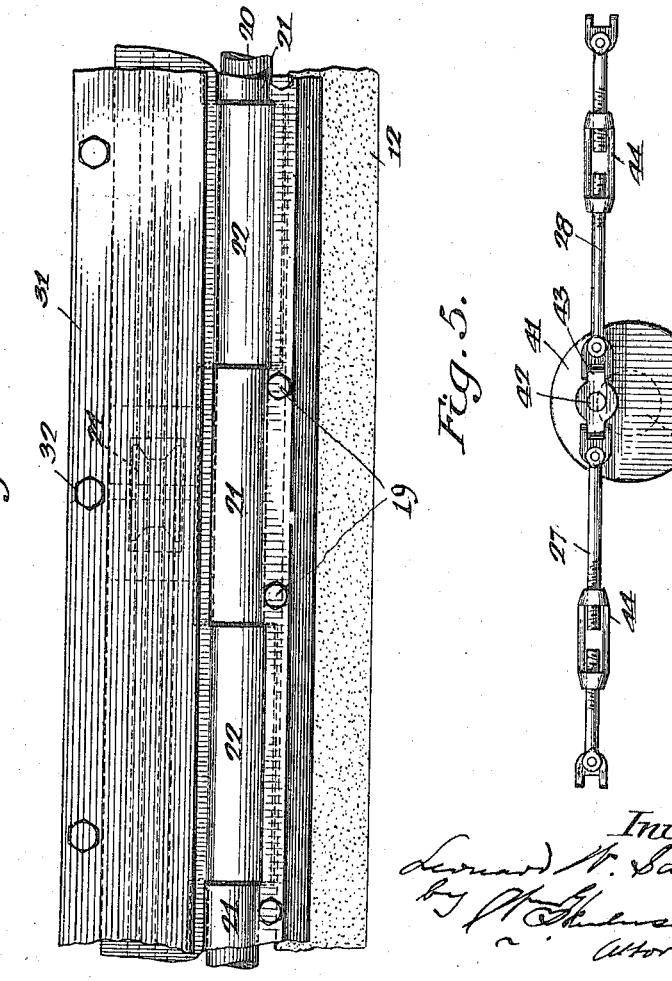
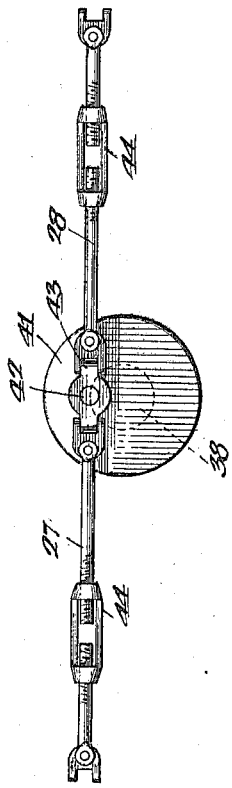
Inventor:

UNITED STATES PATENT OFFICE.

LEONARD WATSON SAINE, OF ATLANTA, GEORGIA.

MACHINE FOR SHARPENING GIN AND OTHER LIKE SAWS.

1,220,894. Specification of Letters Patent. Patented Mar. 27, 1917.

Application filed June 28, 1916. Serial No. 106,396.

*To all whom it may concern:*

Be it known that I, LEONARD W. SAINE, a citizen of the United States, residing at Atlanta, in the county of Fulton and State of Georgia, have invented certain new and useful Improvements in Machines for Sharpening Gin and other like Saws; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in automatic mechanism for restoring the teeth of linter gin and other similarly constructed saws to working condition by cutting operations. In practice it has been found that the operations necessary to successfully restore the teeth of this type of saw to working condition, are either that of sharpening, abrading, filing or milling, and any number of such or similar operations as may be required.

An object of the present invention is to produce means for successively operating upon the teeth of linter gin saws whereby any one or more of the above mentioned results can be obtained in an efficient, uniform and rapid manner.

Another object of this invention is the production of an automatic mechanism for sharpening, abrading, filing or milling the teeth of linter gin saws, including in combination a movable frame adapted to receive the necessary material for cutting or treating the teeth, said frame being horizontally reciprocated when contacting with the teeth, and suitably hinged for swinging into and out of engagement with the succeeding row of teeth as they are advanced for treatment.

A further object of the present invention is to produce an automatic mechanism of durable construction designed to uniformly treat the teeth of the saws, and readily adjustable with respect to the depth of the cutting edge, the amount of the cut, the relative number of teeth operated upon, and the relative speed of the said operations.

The invention further consists of the combination and arrangement of the several parts hereinafter described and pointed out in the appended claims.

In the drawings:

Figure 1 is a front elevation partly in section on the line 1—1 of Fig. 2 of my improved mechanism showing the linter gin saw suitably mounted on a cylinder positioned on a mandrel or shaft and supported in position for treatment.

Fig. 2 is a vertical sectional view on the line 2—2 of Fig. 1 looking in the direction of the arrow.

Fig. 3 is an enlarged detail sectional view on the line 3—3 of Fig. 1.

Fig. 4 is a top plan view of a portion of the swinging frame and pivoted clamping jaws for holding the cutting material.

Fig. 5 is a detail of the drawing disk and the connecting links, the outer ends of which are secured to the frame for reciprocating the cutting material.

Fig. 6 is a detail end elevation of the feeding mechanism for advancing successively teeth of the saw for treatment, and Fig. 7 is a detail view of a modified form of reciprocating member to which is secured a plurality of cutting elements whereby more than one operation can be performed on the teeth of the saws as they are advanced successively.

The present invention has been designed to remedy certain defects in the present type of filing and gumming machines now in use, and to that end comprises a suitable supporting frame, means for adjustably alining the cylinder carrying the saws in said frame, a longitudinally reciprocating cutting member arranged to swing into and out of engagement with the teeth uniformly, means interposed between the saws for preventing vibration thereof, a feeding mechanism for advancing the teeth successively, and driving means including adjustable connections for regulating the relative speed and amount of the cutting operations.

Referring to the drawings in which corresponding characters designate similar parts, the main supporting stand or frame 1 is provided with end brackets 2 and 3 in which are supported the shaft ends of the saw mandrel, as shown in Fig. 1. A forwardly projecting supporting stand 4 extends from the main frame 1, and positions the driving mechanism with respect to the saw mandrel.

The main stand or support is positioned upon any suitable base and is preferably secured thereto by bolts 5.

A linter type of gin saw herein shown is rotatably mounted in the bearing support 6 provided on the bracket 2 and the adjustable bearing support 7, movably supported upon the bracket 3. The adjustable bearing support 7 comprises a vertically guided depending rack bar 8 designed to engage a gear 9 supported in the main frame 1. The gear 9 is rotated through the shaft 10 on the end of which latter any suitable form of crank or wrench can be applied. While I have shown this form of adjustment, it will be readily understood that various other means may be adopted including a worm and gear, threaded rod and the like.

The operating mechanism for treating the teeth when sharpening, abrading, filing or milling is preferably located to one side of the saw mandrel and for the present purpose will be described as positioned on the front, or that side to which the teeth point and rotate when in use as a gin saw.

The operating mechanism comprises a reciprocating cutter bar 12 arranged to engage each row of teeth on the respective saws as they are successively rotated with the mandrel in the bearing supports 6 and 7. This cutter bar is supported in a swinging frame 13 which is moved toward and away from the saws as each row of teeth is treated and the next row presented for operation by the feeding mechanism to be described later.

The reciprocating cutter bar 12 consists of a suitable material for sharpening, filing, abrading or milling and may be of steel, iron, carborundum, corundum, emery, sand or oil stone or other material. It may be in the form of a single strip sufficiently long to engage the entire row of teeth on the saw cylinder, or it may be formed in sections.

The cutting edge of the said bar beveled as at 14 when used as a sharpener or abrader, and of any desirable cutting shape when used as a filing or milling tool.

The frame which supports and reciprocates the bar 12 comprises clamping jaws 15 and 16 pivotally supported on a cross shaft 17, and a guide bar 18. The clamping jaws 15 and 16 receive the cutting bar 12, and bolts 19 serve to clamp the cutting bar in its adjusted position about the shaft 20.

The pivotal sections 21 of the clamping jaws 16 and 17 are spaced longitudinally of the shaft 20 about which latter the said jaws can be adjusted in positioning the beveled edge of the cutting bar 12 in the teeth of the saws as will be readily understood.

The guide bar 18 of the reciprocating frame is provided with supporting lugs 22 for the shaft 20 spaced intermediate the pivotal sections 21 of the clamping jaws. A tongue 23 is also formed on the guide 18 and is arranged to slide on rollers 24. Any suitable form of ball or roller bearing may be substituted for the rollers 24 in providing a free and easy reciprocating movement for the guide bar 18. The said bar 18, is held in position in a track formed at the upper end of the swinging frame 13.

The mechanism for reciprocating the cutter bar 12 is connected to the under side of the clamping jaws or projecting lugs of the guide bar 8 by universal joints at 25 and 26, and comprises oppositely extending links 27 and 28 which are in turn connected to a driving disk mechanism to be described hereinafter.

The swinging frame 13 which supports the cutter bar 12 and in the upper end of which the guide bar 18 reciprocates, comprises sleeves 29' provided with a plurality of substantially vertically extending arms 29 having secured to their upper ends a plate 31 which together with the rollers 24 forms the track for the reciprocation of the guide bar 18. The sleeves 29' are freely mounted upon a cross shaft 30. Screws 32 secure the plate 31 to the upper ends of the arms 29, see Fig. 3.

The mechanism for swinging the frame toward and away from the teeth of the saws, comprises links 33 and 34 pivotally connected to the intermediate arms 29 of the frame. These links 33 and 34 are in turn connected to pins eccentrically positioned on disks which form a part of the driving mechanism hereinafter to be described. The means for preventing vibration of the saws while being treated will now be described.

Secured to the shaft 30 by clamps 35 is a frame 36 having extending therefrom spaced arms 37 which are adapted to enter the space between the respective saws on the cylinder beneath the cutting point, when the cutting bar 12 engages the row of teeth to sharpen, file, abrade, or mill the same. The clamp 35 provides for the adjustment of the frame 36 and the relative movement of the arms 37.

By this construction it will be seen that all tendency of the saw disks to vibrate will be prevented, and a uniform treatment of each row of teeth obtained.

The driving mechanism for reciprocating the cutter bar 12, and swinging the frame carrying the said cutter bar into and out of engagement with the teeth of the saws, comprises a drive shaft 38 mounted in bearing support 39 of the forwardly extending bracket. A driving pulley 40 is keyed to one end of the said drive shaft and is driven by a belt from any suitable source of power. While I have shown a single pulley it will be understood that a stepped pulley for obtaining varying speeds can be substituted. On the opposite end of the driving shaft 38, a driving disk 41 is keyed, having a pin 42 arranged eccentrically of the driving shaft. Pivotally mounted on the pin 42 is a yoke 43 to each end of which one end each of the links 27 and 28 connected to the reciprocating frame, is secured. Adjusting screws or turn-buckles 44 are provided in each link.

From this construction it will be seen that as the driving shaft 38 is rotated the pin 42 on the drive disk 41 will move the yoke member 43 and through the link connections 27 and 28, the reciprocation of the cutter bar is obtained.

The driving mechanism for swinging the cutter bar into and out of engagement with the teeth of the saw is operated through gears 45 and 46 secured to the drive shaft 38, and another shaft 47, respectively, see Fig. 2.

The shaft 47 is mounted in a bearing support 48 on the forwardly extended bracket and is provided on its inner end with a bevel gear 49 which is adapted to mesh with a similar gear 50 keyed to a cross shaft 51. The cross shaft 51 is supported in a suitable bearing in the forwardly extending bracket 4 of the main frame, and is provided at each end thereof with disks 52 and 53. Similarly eccentrically mounted pins 54 are provided in each disk 52 and 53, and are designed to receive the respective ends of the links 33 and 34 connected to the intermediate arms 29 as hereinbefore mentioned. Suitable turnbuckles 55 are provided in the links 33 and 34 and permit of adjustment. By this construction it will be seen that as motion is transmitted from the driving shaft 38 to the shaft 47, the rotation of the disks 52 and 53 will operate the links 33 and 34, and by reason of their connection with the arms 29 secured to the pivotally mounted sleeves the frame 13 will swing toward and away from the teeth of the saws.

As each row of teeth is cut by the bar 12 in its reciprocating path of travel, and the said bar swung on the frame 13 away from the teeth, the succeeding row of teeth of the saws is advanced by a feeding mechanism now to be described.

Referring to Figs. 1 and 6 of the drawings, the feeding mechanism comprises a ratchet 56 provided with a number of ratchet teeth corresponding in number to the teeth of the circular saws on the cylinder. A hub 57 is carried by the ratchet 56 and extends through the bearing support 6 where it is secured by a set screw 58 to one end of the mandrel or shaft of the saw cylinder. Cooperating with the ratchet teeth is an actuating pawl 59 mounted upon a pin 60 extending from the frame of the machine. A slot 61 guides the pawl 59 as it is operated by the levers into the teeth of the ratchet for advancing the saw teeth.

A spring actuated holding pawl 62 also cooperates with the ratchet and prevents any tendency of overthrowing, or backward movement thereof.

The means for operating the pawl 59, comprises pivoted levers 63 and 63' mounted on a shaft supported on arms 64 and 64' extending to the main frame of the machine.

Connected to the lever 63' is a short link 65, and connected to the lever 63 is a longer link 66. The lower link 66 connects with the actuating pawl 59 and is provided with an adjusting turnbuckle 67. The shorter link 65 is connected to one of the arms 29 of the swinging frame 13.

From this construction it will be apparent that as the swinging frame 13 is moved forward and backward, the short link 65 on the backward movement of the frame 13 will rock the levers 63 and 63' which in turn will move the link 66 thereby operating the pawl 59 and advancing the ratchet, and the teeth of the saws.

In operation, the linter gin saw is first positioned in the supporting bearing. The cutting material, depending on the operation or treatment desired is then fitted into the clamping jaws and secured in place. Now when the machine is started the drive shaft 38 will revolve the disks thereby moving the links 27 and 28 and reciprocating the cutting material. Through the gear reduction shown on the drawings it will be seen that the shaft 47 is rotated at a slower speed than that of the drive shaft, and as the said shaft 47 is rotated at a slower speed the disks 52 and 53 will be rotated through the bevel gears 49 and 50, and by reason of the link connections 33 and 34 hereinbefore described, the frame 13 carrying the cutting material, will be moved into and out of engagement with the teeth after each operation. As the frame 13 moves backward or away from the teeth, the feeding mechanism for the succeeding row of teeth will be operated as hereinbefore described, and the cutting operation repeated until the teeth of the saws are restored to their proper operative condition.

Referring to Fig. 7 of the drawings I have shown a modified form of clamping jaws wherein a multiple operation can be performed. In addition to the usual clamping jaws 15 and 16 and the therein held cutting material, an upper set of clamping jaws 67 and 68 are provided in which another character of cutting material can be inserted. By this construction it will be seen that any two of the desired treating materials can be inserted, one above the other. A corresponding change of the feeding mechanism can also be made in feeding more than one tooth at a time. Where it is desired to mill or cut the saw disk round, it will be seen that the milling and sharpening operation can be performed in a single operation of the machine, by the use of the multiple clamping jaws and the insertion of the proper materials for cutting and sharpening.

From the foregoing it will be obvious that an efficient cutting machine has been produced wherein the filing, sharpening, abrading or milling operation on the saw teeth can be readily accomplished in a minimum amount of time.

Having thus described my invention what I claim as new and desire to secure by Letters Patent is:

1. The combination with a main frame for supporting a series of saws, of a movable frame having a cutting edge adapted to engage a row of teeth of the said series of saws, means for reciprocating said cutting edge when in contact with a row of teeth of the saws, means for withdrawing said cutting edge from the row of teeth, and means for rotating the saws when the cutting edge is withdrawn from said teeth.

2. The combination with a main frame for supporting a series of saws, of a movable frame, a movable carriage mounted in said movable frame, a cutting tool carried by said movable carriage adapted to engage a row of teeth of the said series of saws, means for reciprocating the said carriage when the cutting tool is in contact with a row of teeth, means for swinging said movable frame and withdrawing the cutting tool from the row of teeth, and means for advancing a succeeding row of teeth of the series of saws when the cutting tool is withdrawn.

3. The combination with a main frame for supporting a series of saws, of a movable frame, a sliding carriage mounted in said movable frame, a cutting tool adjustably connected to said sliding carriage and adapted to engage a row of teeth of the said saws, adjustable means for reciprocating the said sliding carriage when the cutting tool is in contact with a row of teeth, adjustable means for swinging the said movable frame and withdrawing the cutting tool from the row of teeth, and means for advancing a succeeding row of teeth of the series of saws when the cutting tool is withdrawn.

4. The combination with a main frame for supporting a series of saws, of a movable frame, a sliding carriage mounted in said movable frame having clamping jaws pivoted thereto, a cutting tool secured in said clamping jaws and adapted to engage a row of teeth of said saws, means for reciprocating the said sliding carriage when the cutting tool is in contact with a row of teeth, means for swinging the said movable frame and withdrawing the cutting tool from the row of teeth, and means for advancing a succeeding row of teeth of the series of saws, when the cutting tool is withdrawn.

5. The combination with a main frame for supporting a series of saws, of a cutting tool adapted to engage a row of the teeth of the series of saws, means for reciprocating said cutting tool when in contact with a row of teeth, means for withdrawing said cutting tool from the row of teeth, and means for advancing the succeeding row of teeth when the cutting tool is withdrawn.

6. The combination with a main frame for supporting a series of saws, of an adjustable cutting tool adapted to engage a row of teeth of the series of saws, and means for reciprocating said cutting tool when in contact with a row of teeth of the said series of saws.

7. The combination with a main frame for supporting a series of saws, of a cutting tool adapted to engage a row of teeth of the said series of saws, and means for reciprocating said cutting tool.

8. In a device of the class described, the combination with a main frame for rotatably supporting a series of saws having an adjustable bearing support, of an adjustable cutting tool adapted to engage a row of teeth of the said series of saws, means for reciprocating said cutting tool when in contact with said teeth, and means for advancing a succeeding row of teeth of the series of saws when the cutting tool is out of contact with said teeth.

9. The combination with a main frame for supporting a series of spaced saws, of another frame, a cutting tool carried by said second frame, a plurality of spaced arms provided on said second frame and arranged to extend between the series of spaced saws, and means for reciprocating the cutting tool when in contact with the teeth of the saws.

10. The combination with a main frame for rotatably supporting a series of spaced saws, of a movable frame, a sliding carriage mounted in said movable frame, a cutting tool connected to said sliding carriage and adapted to engage a row of teeth of the said saws, a plurality of arms movable with the movable frame and arranged to extend between the series of spaced saws, means for reciprocating the said sliding carriage when the cutting tool is in contact with a row of teeth, means for swinging the movable frame and withdrawing the cutting tool from the row of teeth, and means for advancing a succeeding row of teeth of the series of saws when the cutting tool is withdrawn.

11. The combination with a main frame for rotatably supporting a series of saws, of a movable frame having a cutting tool mounted thereon, means for reciprocating the said cutting tool when in contact with a row of teeth, and means for advancing the succeeding row of teeth when the cutting tool is withdrawn including a ratchet secured to the series of saws, and a pawl operated by the movable frame.

12. In a device of the class described, the combination with a main frame for rotatably supporting a series of saws, of a movable frame having a cutting tool mounted thereon, means for reciprocating the said cutting tool when in contact with a row of teeth, and means for advancing the succeeding row of teeth when the cutting tool is withdrawn including a ratchet secured to the series of saws, and a pawl adjustably connected to the movable frame.

13. In a device of the class described, the combination with a main frame for rotatably supporting a series of saws, of a multiple cutting tool adapted to engage a plurality of rows of the teeth of the series of saws, means for reciprocating said multiple cutting tool when in contact with a plurality of rows of teeth, means for withdrawing said multiple cutting tool from the rows of teeth, and means for advancing succeeding rows of teeth.

14. The combination with a main frame for rotatably supporting a series of saws, of a plurality of superimposed cutting tools adapted to engage a plurality of rows of teeth, means for reciprocating said superimposed cutting tools simultaneously when in contact with the said rows of teeth, means for withdrawing said cutting tools simultaneously, and means for advancing succeeding rows of teeth.

In testimony whereof I affix my signature in presence of two witnesses.

LEONARD WATSON SAINE.

Witnesses:
F. G. CHALMERS,
VERA SARGENT.

Copies of this patent may be obtained for five cents each, by addressing the "Commissioner of Patents, Washington, D. C."